United States Patent [19]

Guzzetta et al.

[11] 4,221,517
[45] Sep. 9, 1980

[54] BRICK DEHACKER AND STACKER

[75] Inventors: Joseph A. Guzzetta, Newport Beach; William P. Osborn, Whittier; Terance M. King, Placentia, all of Calif.

[73] Assignee: AMI Industries, Inc., Downey, Calif.

[21] Appl. No.: 883,293

[22] Filed: Mar. 3, 1978

[51] Int. Cl.² .......................................... B65G 57/26
[52] U.S. Cl. ................................. 414/34; 294/63 R; 414/36; 414/61; 414/113; 414/120; 414/786
[58] Field of Search .................. 214/6 A, 6 DK, 6 S, 214/8.5 C, 152; 294/63 R; 414/32, 34, 35, 113, 120, 786, 36, 61

[56] References Cited

U.S. PATENT DOCUMENTS

| | | | |
|---|---|---|---|
| 2,666,663 | 1/1954 | McDonough | 294/63 R |
| 3,717,264 | 2/1973 | Lingl | 214/8.5 C |
| 3,834,298 | 9/1974 | Paschal et al. | 214/6 A X |
| 3,917,080 | 11/1975 | Jones | 214/6 A |
| 3,924,756 | 12/1975 | Milholen et al. | 214/6 A |
| 3,941,048 | 3/1976 | Oe et al. | 214/6 DK X |
| 3,958,506 | 5/1976 | Salts | 294/63 R X |

FOREIGN PATENT DOCUMENTS

969527  9/1964  United Kingdom .................... 214/6 H

*Primary Examiner*—L. J. Paperner
*Attorney, Agent, or Firm*—Pearne, Gordon, Sessions

[57] ABSTRACT

A method and apparatus for dehacking and stacking brick or the like is disclosed for automatically removing arrays of brick from a hack and for producing stacks of arrays suitable for packaging. A gripper transfer grips full arrays of brick resting on the kiln car and deposits such arrays on one of two compacting tables. While resting on the tables, the arrays are compacted to ensure lengthwise and lateral abutting alignment of the brick in the arrays. The brick are subsequently transferred after compacting directly to a stacking elevator on which the stack is formed. One compacting table is utilized to produce void rows and operates to withdraw compacted arrays from the stacking location so that brick can be removed to produce the required voids. The array with void rows is then returned to the stacking station for transfer to the stacking elevator at appropriate times in the machine cycle. The arrays consist of upper and lower courses and the void rows are formed only in the upper courses so that a full lower course can be gripped to support the void row course during transfer from the compacting table to the stack.

11 Claims, 12 Drawing Figures

BRICK DEHACKER AND STACKER

BACKGROUND OF THE INVENTION

This invention relates generally to brick handling equipment and more particularly to a novel and improved method and apparatus for dehacking brick and forming the brick in stacks for packaging.

PRIOR ART

The various dehacking machines are known for removing brick from kiln cars and for stacking the brick for strapping in packages suitable for storage and shipping. Examples of such machines are described in U.S. Pat. Nos. 3,392,851; 3,474,917; 3,487,959; 3,491,901; 3,601,266; 3,656,634; 3,917,081; and 3,924,756. In most instances the brick are removed from the kiln car and are deposited on conveyors which transport the brick through various grouping operations to a stacking position. The bricks are then moved from the conveyor to a stacking elevator on which the brick are stacked for subsequent movement to a strapper which straps the brick and packages for storage and shipment. Such packages are provided with void rows to permit the handling of the package by fork lift trucks or the like. In U.S. Pat. No. 3,924,756 the brick are moved from a conveyor onto a receiving table. The bricks resting on the receiving table are then gripped and supported by the gripper while the receiving table is removed to allow a stacking elevator to be raised up to the brick supported by the gripper and brick are then released onto the stacking elevator.

Such prior art machines tend to encounter wear problems if the brick are required to slide along a support system because fired brick are hard and abrasive and will wear away the supporting surface. Further when the brick are handled excessively the machinery cost is relatively high and the possibility of brick damage increases.

SUMMARY OF THE INVENTION

In accordance with the present invention a method and apparatus is provided in which the arrays of brick are transferred directly from the kiln car to a compacting tray or support table on which they are deposited. While supported on such table the array is compacted and the rows are aligned. Such compacting and aligning operation involves a minimum of sliding of the brick with respect to the supporting table so that excessive wear is not encountered.

The compacted and aligned array is then gripped and removed from the table for deposit directly on the stacking elevator. With such machine, conveyors are not required and a minimum amount of brick handling occurs. Therefore, breakage is minimized.

In the illustrated embodiment a gripper transfer engages the sides of an array of spaced rows of endwise aligned brick resting on a kiln car. The gripper transfer moves the rows laterally until they abut and are gripped. The transfer then transfers the gripped arrays to the stacking locations where the brick are released either on a setting table or a void row table. Each table is horizontally movable from an extended position over a stacking elevator and a retracted position clear of such elevator.

While located on such tables the rows are engaged on their ends to compact the array and to ensure lateral alignment of the brick with corresponding brick in adjacent rows.

After such endwise compacting the arrays are gripped along their opposite sides to ensure compacting of the lateral rows in the array.

After side gripping of the arrays on the setting table the brick are supported by the side grippers and the setting table is withdrawn to allow the stacking elevator to be raised to engage the clamped array either by the elevator itself or by a previously deposited array. The side grippers are then released and the elevator is lowered to lower the array so the subsequent cycle of operation of the machine can be performed.

After side compacting of an array on the void forming table to complete the aligning and compacting operation, the side grippers are retracted and the void table is retracted to remove the array resting thereon from the stacking station. While retracted and while subsequent cycles utilizing the stacking table are being performed, selected brick are removed from the array on the void forming table to produce the required voids.

The arrays on the void table include upper and lower layers and the brick are removed only from the upper layer, leaving the full lower layer, and a separator board is positioned over the voids. At an appropriate time in the stacking operation the void table is again extended, returning the array supported thereon to the position above the stacking elevator. The lower layer is then gripped by the side grippers to support the array while the empty void forming table is retracted. Such array is then deposited on the elevator in the usual manner. Subsequent full arrays are then deposited to complete the stack.

In order to minimize any sliding movement of the brick with respect to the two tables, the illustrated embodiment provides a structure in which the tables drop down slightly from the array during the initial portion of the retracting operation.

With a machine incorporating the present invention, the dehacking operation is performed with a minimum amount of handling of the brick, so the initial cost of the machine and maintenance costs are minimized. Further, the possibility of damage to the brick during the various handling operations is reduced because the amount of handling is minimized. Still further, because the brick do not have to slide a substantial amount on supporting surfaces, excessive amount of wear of such supporting surfaces does not occur.

DETAILED DESCRIPTION OF THE DRAWINGS

Figure 1:
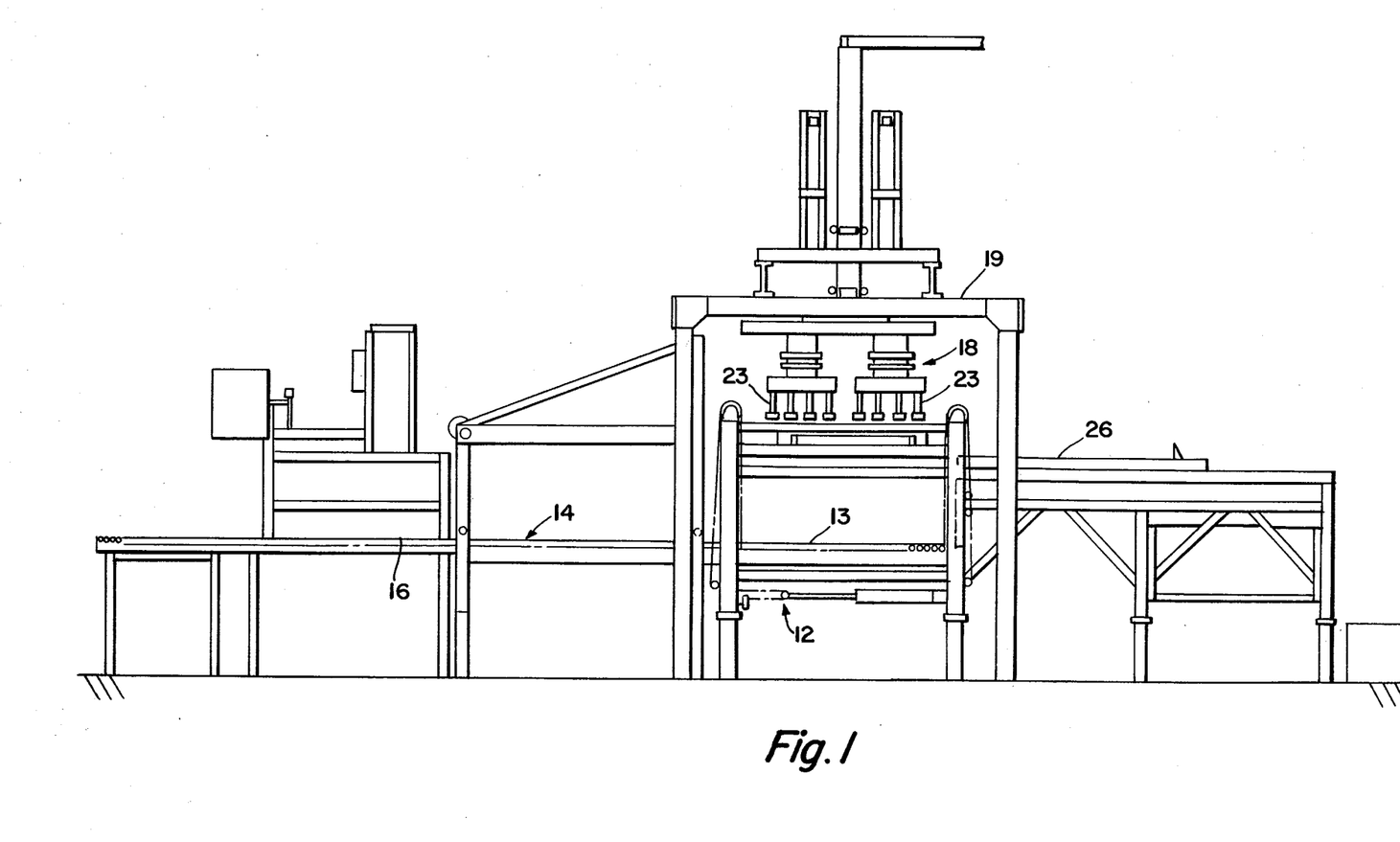
FIG. 1 is a schematic side elevation of a preferred form of machine in accordance with the present invention, illustrating the physical arrangement of the machine with respect to the void forming table and the strapper.
Figure 2:
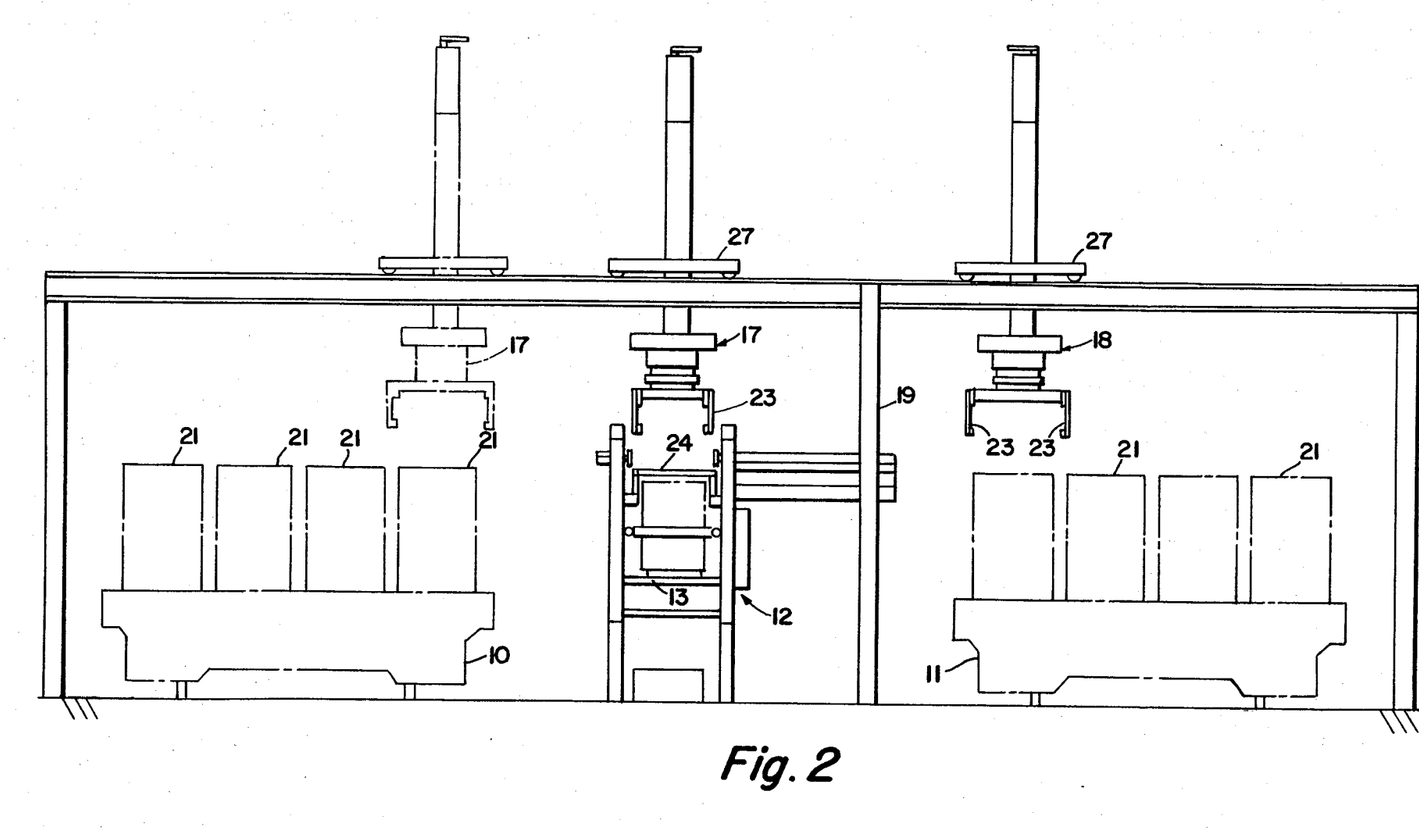
FIG. 2 is a side elevation taken along a plane substantially perpendicular to the elevation of FIG. 1, again illustrating the general physical arrangement of the machine.

FIGS. 1 and 2 illustrate the general overall arrangement of the machine in a relatively schematic manner. The illustrated machine is arranged to permit unloading or dehacking of two kiln cars 10 and 11, which roll along tracks into the unloading position on opposite sides of the stacking station indicated generally at 12. Located at the stacking station 12 is a vertically movable elevator 13 on which the stack is progressively formed to the required height. From the elevator the stack is moved to a strapper feeder at 14 and then through a strapper located in the position at 16. The strapper feeder 14 and strapper are schematically illustrated, since they form no part of the present invention, except to the extent that the strapper functions to strap the stacks formed by the machine according to the present invention.

Two gripper transfers 17 and 18 of similar structure and function are provided on a support frame 19 to unload the kiln cars 10 and 11, respectively. The gripper transfer 17 is movable in a horizontal direction from the stacking station to positions over the kiln car 10 for gripping grids or arrays of brick from the kiln car and for transporting such grids or arrays to the stacking station 12 in a manner described in more detail below. Similarly, the gripper transfer 18 is movable from positions over the kiln car 11 to the stacking station 12 to progressively grip and transfer such arrays or grids from such kiln car. The structures of the two gripper transfers 17 and 18 are essentially identical, so only a single gripper transfer will be described in detail, with the understanding that the description applies equally to both gripper transfers.

An operator provided with the control console controls the operation of the two gripper transfers to position them for gripping selected arrays from the kiln cars. However, the machine is preferably provided with automatic controls for operating the respective gripper transfers to the position at the stacking station 12 once the gripping operation has been initiated. Further, the system is arranged to prevent the two gripper transfers from attempting to simultaneously occupy the same location. In normal practice, the two gripper transfers 17 and 18 function sequentially to transfer a grid or array first from the kiln car 10 and then from the kiln car 11. Since sequential arrays are transferred to the stacking station from different sources, blending is automatically achieved with the present machine. Further, the operator selects the arrays being gripped from a particular kiln car during a particular gripping operation so as to ensure good blending of the bricks positioned in the stack.

Figure 9:
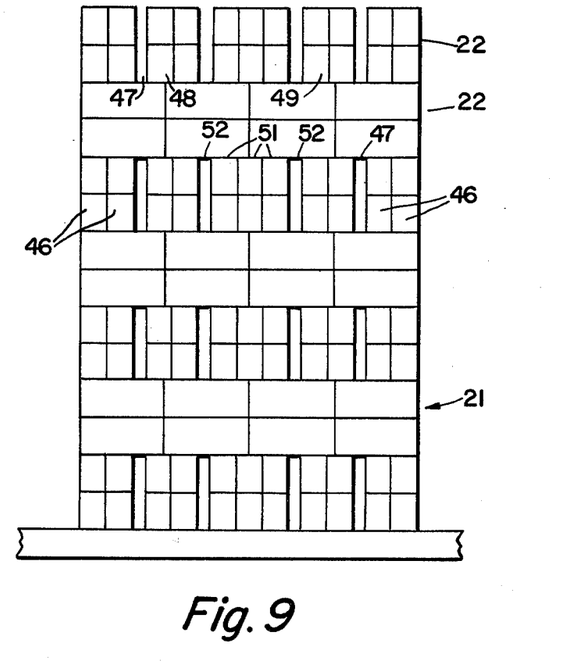
FIG. 9 is a side elevation of one hack or stack on a kiln car illustrating one typical array pattern.

The fired brick are positioned on the kiln cars 10 and 11 in hacks or stacks 21 in a manner substantially as shown in the U.S. Pat. Nos. 3,656,634 and 3,917,081 supra, and such patents are incorporated herein by reference. Each stack 21 includes an array of parallel rows of endwise abutting brick 22, wherein each array includes two layers, with the brick in the upper layer resting on and in vertical alignment with the brick in the lower layer, and wherein at least some of the rows are laterally spaced. Each array is positioned in the stack perpendicular to the next array above and below it within the stacks 21, as best illustrated in FIG. 9.

The gripper transfers are mounted in the manner described in greater detail below so that they can be indexed through 90 degrees from the illustrated position to a position at right angles to the illustrated position, to allow the gripper fingers 23 to be positioned along the sides of the arrays in the two positions mentioned above. Once the gripper fingers are positioned adjacent to the arrays, the fingers are moved toward each other, causing the rows in the array to be compacted laterally until the entire array can be positively gripped for transfer to the stacking stations 12.

In the illustrated embodiment, the array consists of two layers and the gripper transfer is arranged to positively grip only the lower layer of each array. The upper layers rest on the lower layers during the transporting operation. After gripping, the gripper transfers 17 and 18 then function to transport an array to a setting table 24 or a void forming table 26 on which the arrays are deposited.

Figure 5:
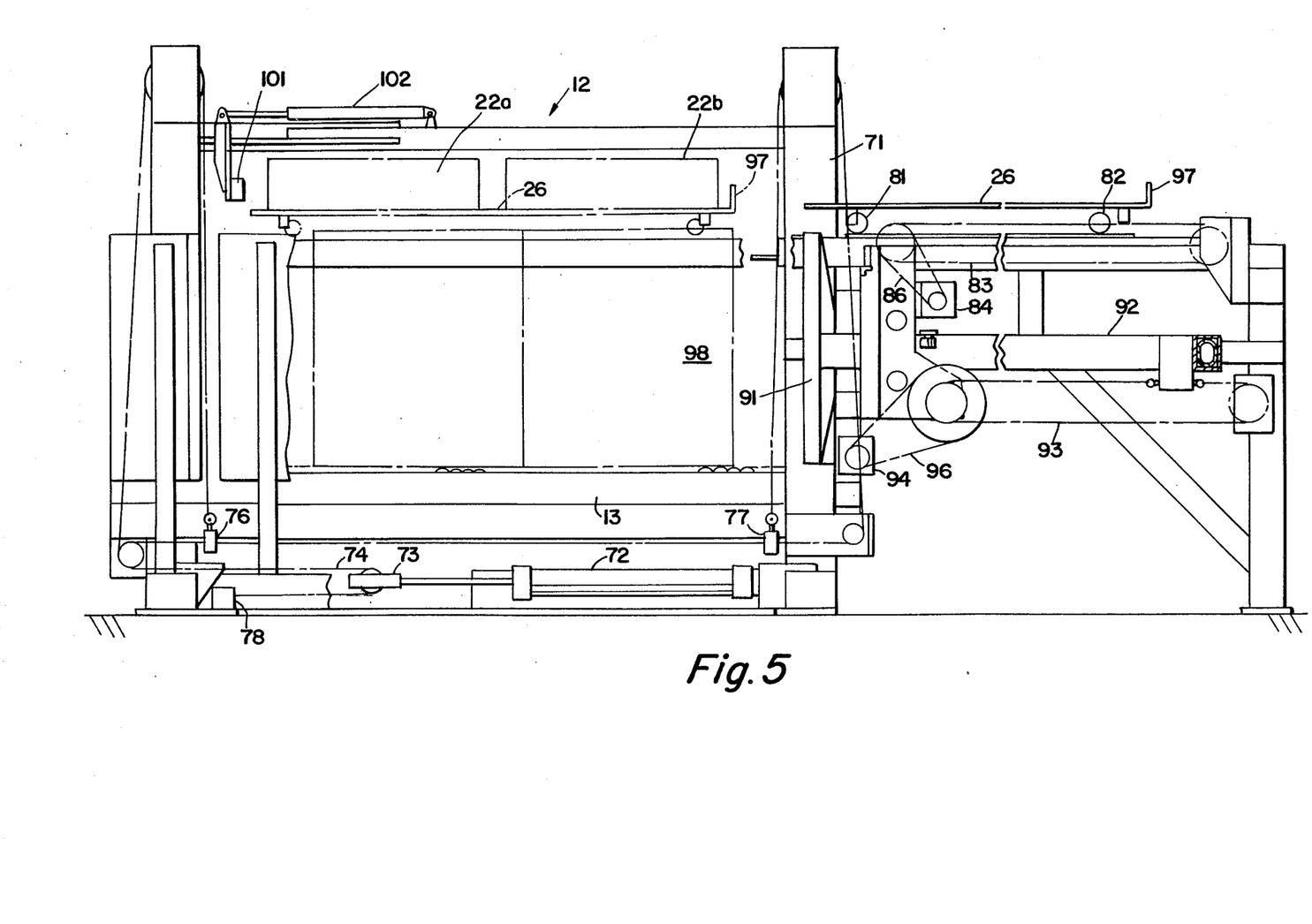
FIG. 5 is an enlarged, fragmentary, side elevation, with parts removed for purposes of illustration, showing the structural arrangement at the stacking elevator, the void table actuation and the pusher for moving completed stacks to the strapper feeder.
Figure 7:
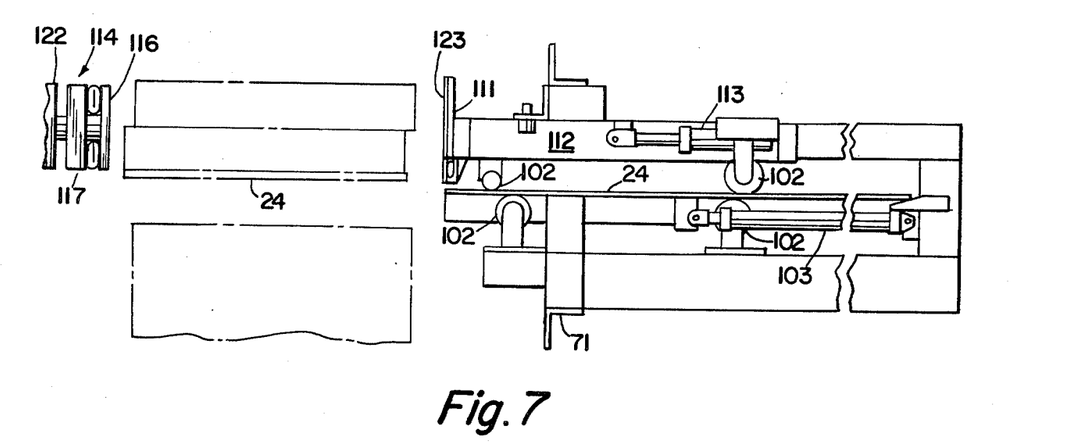
FIG. 7 is an enlarged, fragmentary view, again with parts broken away for purposes of illustration, illustrating the side gripping mechanism and the setting table support and actuation mechanism.

The setting table 24 is extendible to the extended position illustrated in FIG. 2 over the stacking elevator, and is retractible to a position clear of the elevator, as illustrated in FIG. 7. The void forming table 26 is also extendible to a position over the elevator 13 and is retractible from such position to clear the elevator, as illustrated in FIG. 5.

Figure 3:
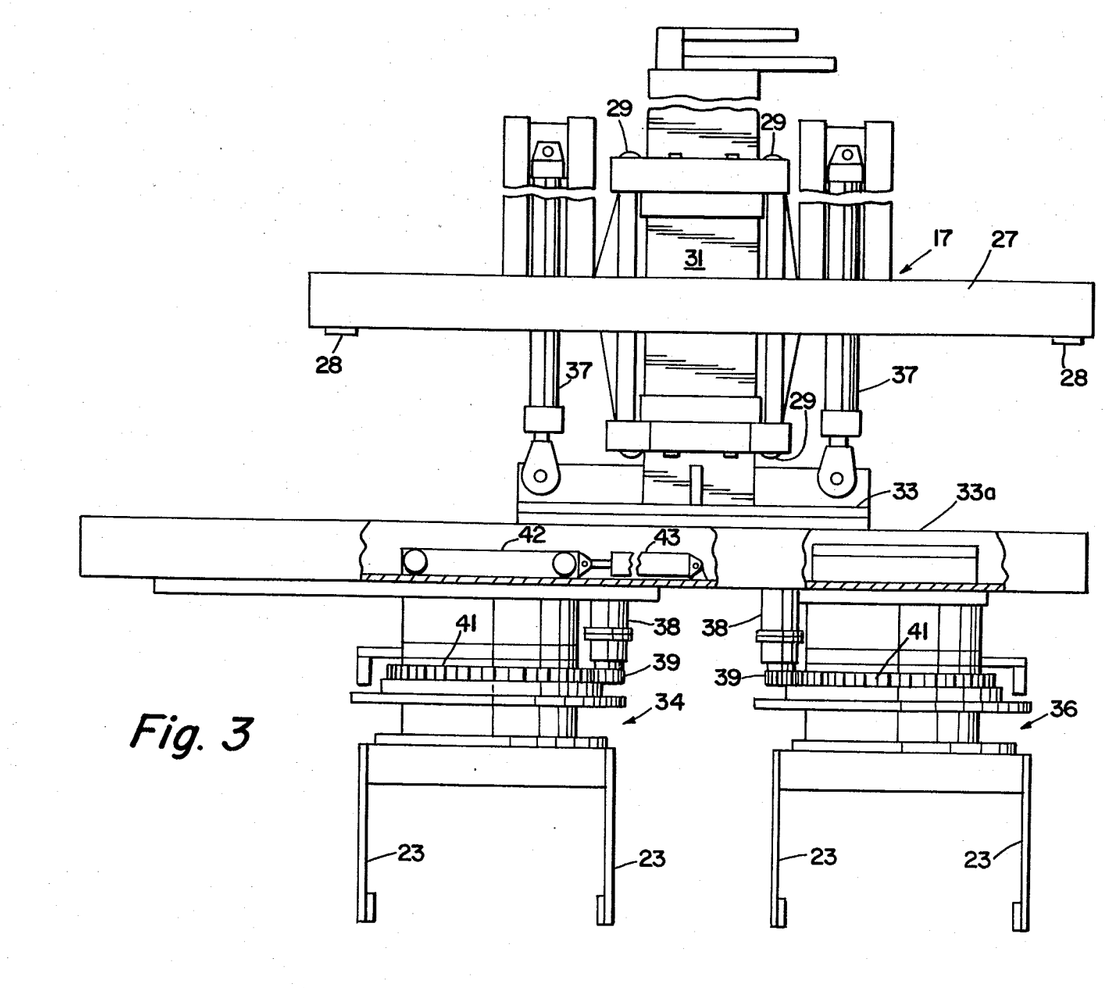
FIG. 3 is an enlarged, fragmentary view with parts broken away for purposes of illustration, illustrating the general physical arrangement of the gripper transfer which removes arrays from the kiln and transports such arrays to either the setting table or void forming table.
Figure 4:
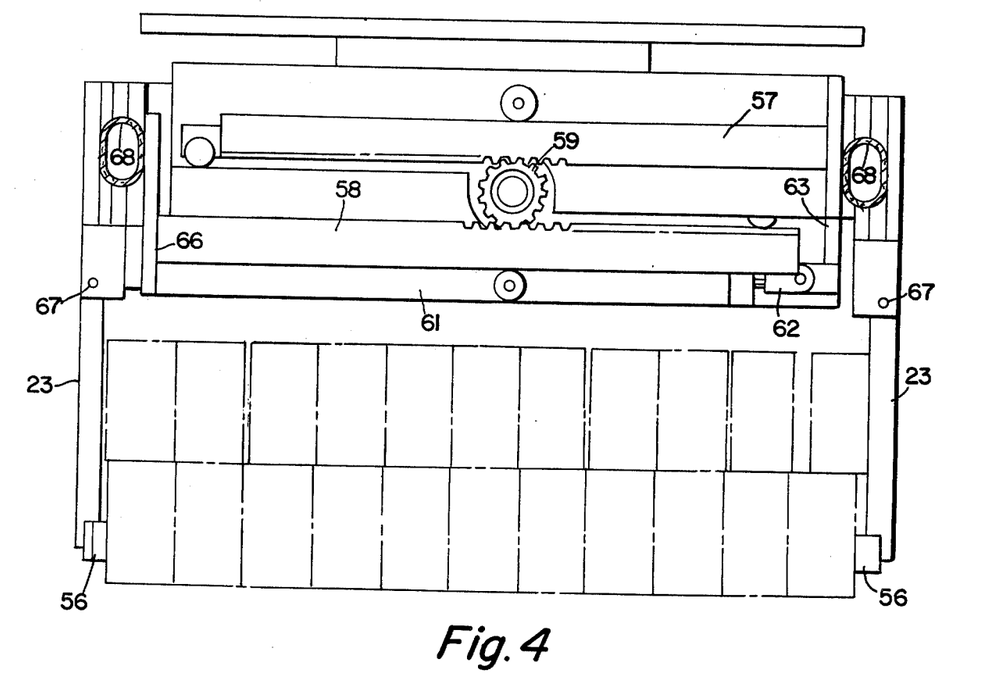
FIG. 4 is an enlarged side elevation of the gripper transfer mechanism itself illustrating the gripper in the gripping position.

Referring now to FIGS. 3 and 4, each gripper transfer 17 and 18 is provided with a carriage 27 having rollers 28 which support the carriage on the frame 19 for rolling movement from positions over the cars to positions over the stacking station. Mounted on the carriage 27 are mast supports providing spaced bearings 29 which engage rectangular masts 31 for vertical movement with respect to the respective carriages 27. Preferably, the mast 31 is square or rectangular in shape so that it is restrained against rotation with respect to the carriage even though it is vertically movable with respect thereto.

A plate assembly 33 is mounted at the lower end of the mast 31 and provides a support for a frame 33a, which in turn supports the gripper assemblies 34 and 36. Vertical movement of the entire gripper assembly with respect to the support carriage 27 is provided by a pair of piston and cylinder actuators 37 which are connected between the carriage and the plate 33, as best illustrated in FIG. 3.

Each of the gripper assemblies includes a lower unit which is journaled for rotation through 90 degrees. In the illustrated embodiment, separate hydraulic motors 38 are connected to rotate the gripper assemblies 34 and 36. Each of the motors 38 is provided with a drive gear 39 which meshes with a ring gear 41 for providing the rotational drive. It should be understood, however, that other forms of actuation may be utilized; for example, piston and cylinder actuators could be connected to produce the required 90-degree rotation.

The gripper assembly 36 is fixed to the beam 33a, but the gripper assembly 34 is mounted for limited lateral movement with respect to the gripper assembly 36 by a carriage 42. A piston and cylinder actuator 43 is connected to reciprocate the carriage 42 back and forth. The reason for such movement of the gripper assembly 34 is to permit the two gripper assemblies to move close together for gripping, but to be separated to provide clearance for the 90-degree rotation, since the dimension of the arrays or grids is greater across the diagonals than across the sides.

FIG. 9 illustrates one of the stacks 21, showing a particular set or grid arrangement which may be utilized in the illustrated embodiment. Each array or grid 22 includes 11 rows 46 of lengthwise abutting brick in which each row is four brick long and two brick high. In the particular pattern illustrated, the outer two rows 46 at each side of the grid abut within the stack 21 and are spaced by spaces 47 from intermediate, double rows at 48 and 49. The double rows 48 and 49 are also spaced from the central group of rows 51, consisting of three abutting rows, by spaces 52. The grids extend perpendicular to the adjacent grids and each grid includes 88 brick.

Each of the gripper transfers 34 and 36 in the illustrated embodiment is provided with four pairs of opposed gripping fingers 23 positioned to engage the sides of the outermost rows of the grid along the lower course thereof. Pivotally mounted on the lower end of each finger is an equalizing block 56, which can tip with respect to the associated gripping fingers at 23 to accommodate for irregularities in the brick surface and to ensure that the gripping forces are distributed with relatively even pressure over a significant area of the associated brick.

Referring to FIG. 4, the four fingers 23 along the right side of the gripper head as viewed in FIG. 4 are supported by a slide 57 and the four fingers along the left side of the gripper are supported on a lower slide 58. In FIG. 4, the gripper is illustrated in the closed position. An idler gear 59, journaled on the frame of the gripper, is connected between the two slides 57 and 58 to ensure that they move in and out an equal distance when the gripper is opened and closed. A piston and cylinder actuator 61 is provided with a piston 62 connected through a plate 63 to the upper slide 57 and a cylinder 64 connected to a plate 66, which is in turn connected to the lower slide 58. Therefore, retraction of the actuator 61 moves the two slides 57 and 58 toward the closed position and extension of the actuator causes the slides to move laterally to the open position. The interconnection provided by the idler gear 59 ensures that the two slides move an equal amount in opposite directions during the opening and closing operations.

Each of the fingers 23 is supported on its associated slide 57 and 58 by a pivot at 67 for limited pivotal movement. Extending along the lengths of each of the slide supports is an inflatable, flexible hose 68 which operates when inflated to urge the lower ends of each of the grippers 23 inwardly for final clamping or gripping. This mechanism provides for the accommodation of differences in sizes between the bricks, warpage which can occur during the firing, and any other variations, to ensure that each gripper and its associated opposed gripper tightly grips one lateral row of the lower layer of the arrays. It should be understood that even though in the drawings the brick are illustrated in direct alignment, in production variations in brick size and shape occur and a given row is often wider than an adjacent row. This would prevent proper gripping of the short lateral row if it were not for the final gripping provided by the inflatable tubes 68. In effect, the inflatable tube functions as a short stroke actuator to ensure full gripping of the entire grid.

In operation, the grippers are lowered while open beside the grid to be gripped until one of the pivoted blocks 56 is positioned adjacent to the side of each outermost brick in the grid along the lower course. The actuator 61 is then retracted, causing the rows in the grid to slide laterally into a compacted array. After the array is fully compacted, the two tubes 68 are inflated to ensure a firm gripping of the entire array and the carriage is raised and moved to position the array at the stacking station 12. Since two gripper assemblies are provided on each gripper 17 and 18, two arrays are gripped and transferred during each operation. Therefore, in the illustrated embodiment 176 brick are transferred each time a gripper 17 or 18 operates. During such transfer, the grippers rotate the arrays if necessary to align all rows delivered to the stacking station with the lengthwise direction of the stacking elevator.

It should be pointed out that gripper transfers of the general type described immediately above have been used in machines of the type disclosed in U.S. Pat. No. 3,656,634 supra, and that such grippers per se constitute part of the prior art and are therefore not specifically part of this invention, except insofar as they provide cooperation with the remaining portion of the machine.

Referring now to FIG. 5, the stacking elevator 13 is supported on a frame 71 for vertical movement. Piston and cylinder actuators 72 are mounted on the frame 71 and are provided with piston-supported sprocket carriages 73, over which chains 74 extend. One chain 74 is connected to each corner of the elevator, for example at 76 and 77, and the other end of each chain is anchored at 78. Consequently, when the piston of the actuator 72 is retracted, the four corners of the elevator are raised through equal distances. The illustrated structure provides motion multiplication so that a given amount of movement of the piston of the actuator 72 produces twice as much vertical movement of the elevator.

The void row table 26 is supported by rollers 81 and 82 for movement from the retracted position illustrated in FIG. 5 to an extended position in which it extends over the elevator 13 to receive a pair of grids 22a and 22b from one of the gripper transfers 17 or 18. Extension and retraction of the void table 26 is provided by a chain drive or the like 83 which is driven by a rotary motor 84 through a connecting chain 86.

A pusher 91 is supported on a ram 92 and operates to push a fully completed stack off the elevator platform 13 into the scrapper feeder 14 when the stacking operation is completed. Here again, a chain drive 93 is provided to reciprocate the pusher 91, and such drive 93 is powered by a motor 94 and intermediate chain drive 96.

The void row table 26 is provided with an upstanding flange 97 positioned in alignment with the right-hand end of the stack at 98, as illustrated in FIG. 5, when the void row table 26 is extended. A compactor bar 101 is mounted on the frame 71 for reciprocating movement between the retracted position illustrated in FIG. 5 and an operative position by cylinders 102. It operates after the two grids 22a and 22b are positioned on the extended void row table to engage the left end of the grid 22a and moves such grids to the right until it engages the end of the right-hand grid 22b and continues to move the two grids until they engage the upstanding flange 97. Such compactor 101 operates in conjunction with the upstanding flange to ensure that all of the bricks in the two grids are compacted in an endwise direction and so that the bricks are laterally aligned. It should be understood that the two grids 22a and 22b consist of upper and lower full layers of brick and that both layers are compacted. After endwise compacting is completed, lateral compacting and aligning are performed to ensure full alignment and compacting of both layers in both directions. The structure and operation for lateral compacting are described below in connection with the operation of the setting table 24.

After the compacting or aligning operations, the lateral compactor is retracted and the void row table 26 is withdrawn to the retracted position clear of the stacking elevator and moves with it the two compacted grids resting thereon so that the appropriate rows can be removed from the upper layer of the two grids to produce the required voids.

Figure 6:
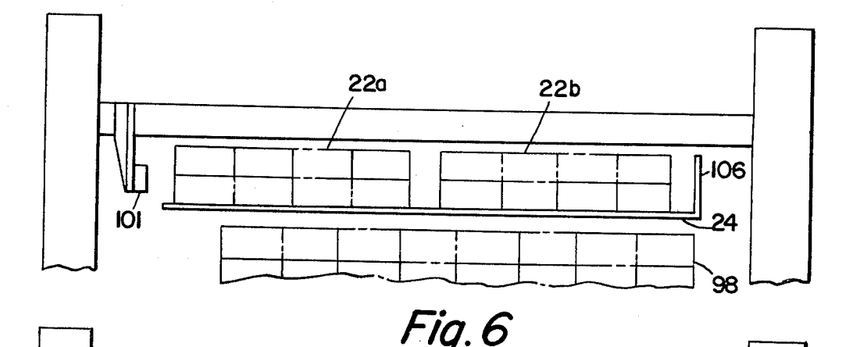
FIG. 6 is a fragmentary view illustrating an array resting on the setting table before the endwise compacting operation.
Figure 6A:
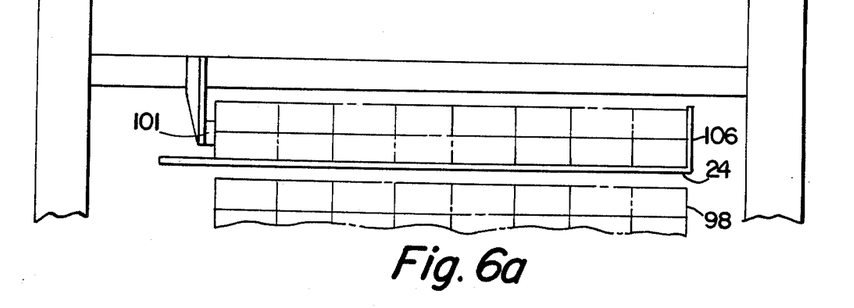
FIG. 6a is a view similar to FIG. 6 but illustrating the apparatus at the completion of the endwise compacting and aligning operation.
Figure 7A:
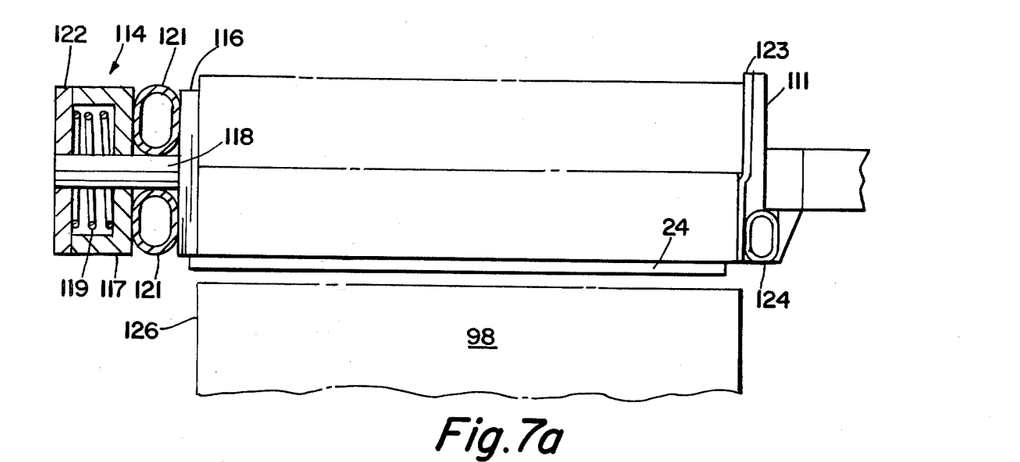
FIG. 7a is an enlarged, fragmentary, schematic view illustrating the side gripper structure in operation.

Referring now to FIGS. 7 and 7a, the setting table 24 is illustrated in full line in its retracted position clear of the stack being formed on the elevator, and in phantom line in its extended position. Such table is supported on rollers 102 for horizontal movement between its extended and retracted positions. An actuator 103 of the piston cylinder type is connected to extend and retract the setting table 24. The setting table 24, like the void row table 26, is provided with an upstanding end flange in alignment with the right side of the stack 98 being formed, as best illustrated in FIGS. 6 and 6a. Here again, the gripper transfers 17 and 18 deposit spaced grids 22a and 22b on the setting table while the setting table is in its extended position, as illustrated in FIG. 6. The compactor bar 101 again operates to engage the left end, as viewed in FIG. 6, of the array 22a and slides it along the table until it engages the right array 22b and then moves the two arrays to the compacted position of FIG. 6a, in which the two arrays are endwise abutting with the upstanding flange 106 on the setting table 24. Here again, the operation of the compactor bar 101 causes the brick to be moved into lateral alignment, as well as compacted. Consequently, any improper alignment of the brick in a lateral direction is eliminated by the endwise compacting operation.

After endwise compacting is completed, lateral alignment and gripping are accomplished by a mechanism best illustrated in FIGS. 7 and 7a. Such mechanism includes a side pusher 111 carried by a ram 112 and powered for extension and retraction by a piston and cylinder actuator 113. In FIG. 7, such mechanism is in the retracted position.

Positioned opposite the side plate 111 is an opposing gripping assembly 114 which includes a plate 116 mounted for limited horizontal movement on a frame member 117. The side gripping assembly 114 is supported by a plurality of lengthwise, spaced rods 118 which extend through the frame 117 and are provided with springs 119 to normally bias the clamping plate 116 in a retracted position. A pair of flexible tube actuators 121 extend between the clamping plate 116 and the frame 117, and when inflated overcome the action of the springs 119 to move the clamping plate 116 to the right to the extended position of FIG. 7a. A stop 122 limits the movement of the clamping plate 116 to the right, as illustrated in FIG. 7a.

The clamp plate 111 is provided with a flexible facing member 123 which is secured to the plate at its upper end and extends below the plate at its lower end. Positioned behind the facing member 123 is another flexible tube 124 which when inflated ensures proper gripping of the lower course of brick.

The operation of side compacting and gripping is as follows. After the end compacting occurs, the actuator 113 is operated to extend the gripper plate 111 to the left, as viewed in FIG. 7a. At the same time, the two flexible tubes 121 are inflated to extend the gripper plate 116. If the upper course is not fully compacted, or is laterally displaced from the lower course, as illustrated in FIG. 7, the two opposed gripping plates laterally move the bricks into alignment. Therefore, the initial operation is to ensure full compacting in the lateral direction and to produce full vertical alignment of the rows. The force output of the two inflatable tubes 121 exceeds the force output of the actuator 113 to ensure that the plate 116 is located in its fully extended position. This ensures that the brick will be aligned with the left-hand face 126 of the stack 98 of arrays already positioned on the elevator. The flexible tube 124 is then inflated to ensure gripping of each of the brick along the lower course and to compensate for variations in row width, which are illustrated with exaggeration in FIG. 7a.

The side gripping performs two functions. First, it ensures that the brick are compacted laterally and aligned in a longitudinal direction; and second, it provides gripping to support the array as the tables are withdrawn. After the side gripping is completed, the setting table 24 is withdrawn and the brick are supported immediately above the stack on the elevator. The elevator is then raised until the array engages either the elevator or a previous array positioned on the elevator. The grippers are then released to allow the elevator and the arrays resting thereon to be lowered.

Figure 10:
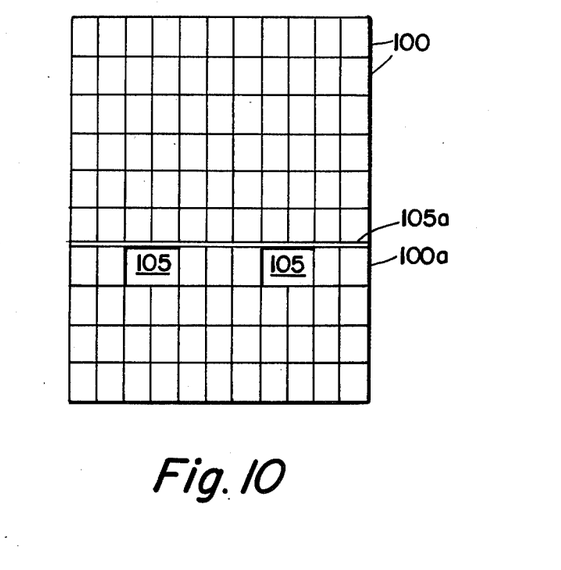
FIG. 10 is a side elevation of a stack formed by the machine for subsequent strapping.

The machine operates with repeated cycles until the stack is formed of the required height and the pusher 91 is then operated to push the stack along the elevator and into the strap feeder 14. The example of a stack illustrated in FIG. 10 has ten courses 100, nine of which are a full 11 brick wide. The void row 100a contains two voids 105 and seven brick. Also each row is eight brick long. Therefore, the machine produces a stack containing 848 brick during each stacking cycle.

The formation of void rows within the stack is accomplished by extending the void forming table 26 and depositing two arrays on the table in the manner described above. The arrays are then compacted endwise and laterally by the operation of the compactor bar 101 and the side compactors. The side compactors are then retracted and the void table is retracted, carrying with it the two compacted grids positioned thereon. The operator then manually removes bricks from the upper course resting on the void table to establish the void while leaving a full lower course. A separator board 105a or the like is then placed on top of the void course and at an appropriate time in the stacking cycle the void table, with the two courses thereon, is returned to the extended position over the stacking elevator. The side grips are then operated to grip the full lower course, and the void table is retracted so that the void course and the full course on which it is resting are then deposited in the stack. The side plate 111 extends down part way along the lower course so that the gripping does not cause closing of the voids. During subsequent cycles of operation, the setting table receives the grids and the stack is completed.

Figure 8:
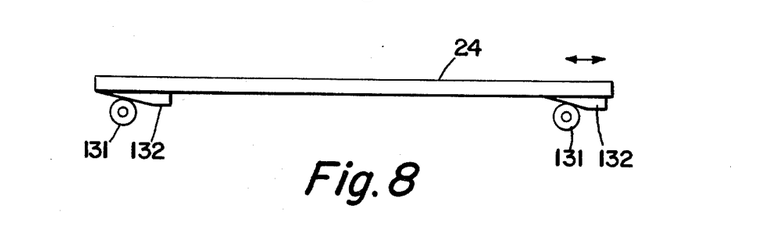
FIG. 8 is a schematic illustration of the table support which cause the tables to be raised slightly at the end of their extension travel and lowered on retraction to minimize sliding between the tables and the brick.

In order to minimize the wear on the two tables, both of the tables are arranged so that they are raised slightly when they reach their extended position and drop down a similar amount at the commencement of the retraction operation. FIG. 8 schematically illustrates the structure utilized for this purpose. Such structure includes a pair of rollers 131 supported on the machine frame at a position adjacent to the extremities of the tables, for example, of the setting table 24. The table is provided with wedges 132 providing a ramp surface which engages the rollers 131 and raises the table as it approaches its final extended position. Upon retraction, the table initially drops down slightly clear of the brick so that the brick do not drag across the table surface during the principal portion of the retracting operation.

In accordance with this invention, the brick are transferred to a compacting table, where they are temporarily supported while the brick are endwise and laterally compacted and aligned. In the embodiment illustrated, the compacting tables are located immediately above the stacking elevator. However, it is within the broader aspects of this invention to provide a system in which the gripper transfer positions the grids on a compacting surface located in other positions with respect to the stacking table, and that transfer means are provided to move the compacted and aligned grid from the compacted surface to the stacking elevator. Further, it is within the broader aspects of this invention to incorporate the end compactor in the principal transfer head so that the gripper transfer, which removes the grids from the kiln car, can position grids on a compacting table or surface and perform the compacting operation within the transfer head while the brick are supported on such surface. In such event, the same gripper transfer can then be used to transfer the brick to the stacking elevator.

In accordance with the present invention, the conveying systems and handling systems required in the typical prior art are eliminated and the amount of handling of the brick is substantially reduced, with attendant savings in machinery costs, reduced wear and reduced tendency to cause breakage due to excessive handling operations.

Although a preferred embodiment of this invention is illustrated, it should be understood that various modifications and rearrangements of parts may be resorted to without departing from the scope of the invention disclosed and claimed herein.

What is claimed is:

1. A dehacker for unloading brick from kiln cars or the like on which brick are stacked in arrays of spaced rows comprising a compacting table, a stacking platform, a gripper transfer operable to grip an array and to position said array on said compacting table, first means separate from said gripper transfer operable to close on opposite first side faces of an array on said compacting table to align the brick in a first direction, second means separate from said gripper transfer operable to close on the other opposed side faces of an array on said compacting table to align the brick in the other direction so that the brick in said array are aligned and abutting in lengthwise and lateral rows, and said second means also being operable to transfer compacted arrays directly from said compacting table to said stacking platform, at least some of said arrays including upper and lower courses with void rows in the upper course thereof, said second means being operable to transfer arrays containing void rows therein from said compacting table to said stacking platform by gripping the lower course of such array.

2. A dehacker and unloader as set forth in claim 1, wherein said second means operates to grip opposed sides of compacted arrays and to support such arrays for transfer to said stacking platform.

3. A dehacker and unloader as set forth in claim 2, wherein said compacting table is movable between an extended position over said stacking platform and a retracted position clear of said stacking platform, and said second means grips said compacted arrays while said compacting table is in said extended position and transfers such compacted arrays to said stacking platform while said compacting table is in said retracted position.

4. A dehacker and unloader as set forth in claim 3, wherein said stacking platform is vertically movable to receive compacted arrays from said transfer means.

5. A dehacker and unloader as set forth in claim 3, wherein there are two compacting tables, one of said compacting tables being operable to move a compacted array to its retracted position for establishing void rows and for returning such array with void rows to said extended position.

6. A dehacker and stacker for removing fired brick from a kiln car or the like and for forming stacks thereof, said fired brick being positioned on said kiln car or the like in arrays of substantially parallel rows of brick in substantial endwise alignment and in which at least some of said rows are laterally spaced comprising, a stacking platform, a support surface, and a handling and compacting means operable to grip an entire array of said kiln car and to deposit it on said support surface, compact and align an array resting on said support surface to provide endwise and lateral abutting alignment of the brick therein, and transfer the compacted arrays directly from said support surface to said stacking platform to produce stacks of vertically aligned arrays thereon, void rows being provided in arrays on said support surface, said handling and compacting means operating to transfer said void row arrays from said support surface to said stacking platform, said arrays including upper and lower courses, said void rows being provided in the upper of said courses, and said handling and compacting means gripping the lower of said courses to transfer compacted arrays from said support surface to said stacking platform.

7. A dehacker for unloading brick from kiln cars or the like on which brick are stacked in arrays of spaced rows and for forming stacks thereof, comprising a compacting table, a stacking platform, a gripper transfer operable to grip an array and to position said array on said compacting table, first means to close on opposite first side faces of an array on said compacting table and to align the brick in a first direction, second means operable to close on the other opposed side faces of an array on said compacting table to align the brick in the other direction so that the brick in said array are aligned and abutting in lengthwise and lateral rows, and said second means also being operable to transfer compacted arrays directly from said compacting table to said stacking platform, said compacting table being adapted to be withdrawn from the array when the bricks are gripped by the second means, and means for moving said compacting table out of contact with said brick prior to any substantial withdrawal of the compacting table.

8. A dehacker for removing stacks of arrays of fired brick from a kiln car or the like and for producing stacks for packaging comprising a stacker platform, two support surfaces, transfer means operable to grip an array of brick on a kiln car or the like including spaced rows of endwise aligned brick and to deposit such array on said support surfaces, said arrays deposited on said support surfaces containing brick which are unaligned and uncompacted, compacting and gripper means operable to engage opposite side faces of said array on said support surfaces and to move the brick to a compacted group in which the brick engage each other and are aligned and abutting in lengthwise and lateral rows, said compacting and gripper means thereafter gripping compacted arrays and sequentially positioning them on said stacking platform to produce the required stack, said stacking platform including a vertically movable stacking elevator operable to progressively receive arrays of brick, said support surfaces being movable between an extended position over said elevator and a retracted position clear of said elevator, said compacting and gripping means being operable to engage the opposite side faces of said array positioned on said support surfaces while said compacting table is in said extended position to provide endwise and lateral abutting alignment of the brick thereon, and said compacting and gripping means being operable to grip and support a compacted array while said support surfaces are moved to its retracted position and to position said compacted array on said stacking elevator, one of said support surfaces operating on retraction to remove compacted arrays to allow forming of void rows and operating thereafter to return arrays with void rows for stacking on said elevator, said arrays including upper and lower courses, said void rows being formed only in upper courses of said arrays, and said compacting and gripping means operating to grip the lower course of an array containing void rows.

9. A dehacker and stacker as set forth in claim 8, wherein said transfer means operates to simultaneously grip and transfer a plurality of arrays, said compacting and gripping means operates to consolidate said plurality of arrays into a single consolidated and compacted array and to position said consolidated array on said stacking elevator.

10. A method of dehacking brick from a kiln car or the like and for producing stacks for packaging thereof comprising gripping an array including laterally spaced rows of endwise aligned fired brick positioned in stacks on a kiln car and transferring such array to a compacting and aligning supporting surface, compacting and aligning the brick in said array on said support surface by engaging opposite side surfaces thereof to move the brick relative to each other until they are aligned and abutting in lengthwise and lateral rows, and thereafter transferring the compacted and aligned arrays directly to a stacking platform to produce a stack of arrays thereon, selected compacted and aligned arrays being provided with void rows before being positioned on said stacking platform, said arrays including upper and lower courses, said void rows being provided only in said upper courses, and said arrays with void rows being transferred to said stacking platform by gripping the lower courses thereof.

11. A method as set forth in claim 10, wherein the step of gripping an array on a kiln car and transferring the gripped array to a support surface includes simultaneously gripping and transferring a plurality of said arrays, and the step of compacting and aligning the brick in said arrays on said support surface includes consolidating said plurality of arrays into a composite array.

* * * * *